United States Patent [19]
Takasaki et al.

[11] 3,715,276
[45] Feb. 6, 1973

[54] ENZYMATIC METHOD FOR MANUFACTURE OF FRUCTOSE FROM GLUCOSE

[75] Inventors: Yoshiyuki Takasaki; Akira Kamibayashi, both of Chiba, Japan

[73] Assignee: Agency of Industrial Science & Technology Govermental, Tokyo, Japan

[22] Filed: Oct. 23, 1970

[21] Appl. No.: 83,168

[30] Foreign Application Priority Data

Oct. 25, 1969 Japan..................................44/85605
Oct. 25, 1969 Japan..................................44/85606

[52] U.S. Cl. .................................195/31 F, 195/118
[51] Int. Cl. ................................................C13k 9/00
[58] Field of Search................195/31, 7, 12, 36, 118; 127/46

[56] References Cited

UNITED STATES PATENTS 3,616,221  10/1971  Takasaki et al.....................195/31 R
3,050,444  8/1962  Holstein et al......................195/31 R

OTHER PUBLICATIONS

Natake et al., Agr. Biol. Chem., Vol. 28 p. 505–509, 1964

*Primary Examiner*—A. Louis Monacell
*Assistant Examiner*—Gary M. Nath
*Attorney*—Ernest G. Montague

[57] ABSTRACT

In an enzymatic reaction for isomerizing glucose into fructose with a glucose isomerase, a method is provided for converting glucose into fructose which is characterized by using calcium carbonate, magnesium carbonate an anion-exchange resin or an amphoteric-ion exchange resin as a pH regulator.

8 Claims, No Drawings

ENZYMATIC METHOD FOR MANUFACTURE OF FRUCTOSE FROM GLUCOSE

This invention relates to a method for efficiently isomerizing glucose into fructose by using calcium carbonate, magnesium carbonate or ion-exchange resin as a pH regulator thereby maintaining the reaction solution at a pH value desirable for glucose-isomerazation in converting glucose into fructose with a glucose isomerase produced by microorganisms.

Previously, the present inventors invented a method for converting glucose into fructose with a glucose isomerase produced by microorganisms. According to the said invention, the glucose isomerase can carry out the isomerization of glucose to fructose under broad reaction conditions, ranging from pH 5.5 to pH 11 and from 45° to 90°C. With a view to preventing sugar from decomposing and protecting the reaction solution against coloration, the desirable reaction conditions are pH 6 to pH 9 and 65° to 75°C. However, since sugar is a relatively unstable substance a very small portion of the sugar is inevitably decomposed to produce an organic acid even if the reaction is carried out under such limited conditions. Accordingly, the pH value of the reaction solution falls and the efficiency of the enzymatic reaction is degraded consequently. In order to prevent the pH value of the reaction solution from falling and to maintain it in a range suitable for the isomerization reaction, alkali must be added at intervals of several hours to regulate the pH value. Such neutralizing operation is easy to carry out in the case of batchwise isomerization reaction. In case where glucose is to be isomerized continuously, however, it is difficult to regulate the pH value of the reaction solution by such operation. In this connection, it is required either to heighten the pH value of the glucose solution preparatorily to feeding it to the reaction column or to use a buffer solution. Even when the pH value of the glucose is heightened in advance, the pH value will gradually fall with the progress of the continuous reaction and eventually reach a level undesirable for the reaction and the isomerization reaction will no longer be carried out efficiently and, wheat is more, the enzyme will be inactivated. Thus, the continuous reaction will come to a stop. If the buffer solution is used for the purpose of maintaining the reaction solution at a required pH value, it must be removed from the reaction product after the reaction. Therefore, this method cannot be carried out on an industrial scale.

A main object of this invention is to provide a method for efficiently accomplishing the isomerization of glucose by keeping the reaction solution constantly at a fixed pH value.

Another object of the present invention is to provide a method which gives a product with small ion concentration and low coloration degree so that the product can be refined with ease.

As a result of research, the inventors have arrived at the discovery that when the enzymatic reaction is carried out in the presence of calcium carbonate, magnesium carbonate or ion-exchange resin as a pH regulator for the isomerization reaction, the organic acid produced in the course of reaction is neutralized by calcium or magnesium or removed by the ion-exchange resin and, consequently, the pH value of the reaction solution is maintained at a pH value desirable for the isomerization reaction and the isomerization reaction is carried out efficiently.

Particularly when calcium carbonate is used as the pH regulator, the calcium carbonate not only serves as a pH regulator but also proves advantageous in that the resultant calcium salt of the organic acid is sparingly soluble, with the result that only a very small amount of ions are dissolved in the reaction solution and the burden of the ion-exchange resin to be used in the refining treatment of sugar solution subsequent to the step of reaction will be lessened to a great extent. According to the conventional method, the total ion concentration in one liter of 50 percent glucose solution is from 4,000 to 5,000 ppm as calcium carbonate. By contrast, the total ion concentration in the sugar solution which has undergone the isomerization reaction by the method of the present invention is 2,524 ppm, a value which is nearly equal to the ion concentration 2,644 ppm of the glucose solution prior to the reaction. This indicates that virtually no increase occurs in the ion concentration in the course of isomerization reaction.

The ion-exchange resin to be used as pH regulator is either an anion-exchange resin or an amphoteric ion-exchange resin. When the reaction is carried out in the presence of such ion-exchange resin, the sugar solution obtained consequently will have a very low ion concentration and a very low coloration degree as compared with the conventional method. To be specific, the total ion concentration per liter of 50 percent glucose solution obtained by the conventional method is on the order of 4,000–5,000 ppm as calcium carbonate, whereas the total ion concentration in the sugar solution obtained by the isomerization reaction according to the method of this invention is found to be about 2,200 ppm, a value smaller than the total ion concentration 2,453 ppm of the glucose solution prior to the reaction. The color (determined spectrophotometrically by difference of absorption coefficients at 420 m$\mu$ and 750 m$\mu$) of the produced sugar solution is less than twice that of the raw solution in the case of the method of this invention compared with about 3.5 times that of the raw solution according to the conventional method.

In manufacturing fructose syrup from glucose, the major part of the production cost goes to the refining treatment of the sugar solution obtained from the reaction, namely, to the treatment directed to decolorization and ion-exchange. However, since the present invention produces a sugar solution which has a low ion concentration and a low degree of coloration as mentioned previously, the production cost can be reduced to a considerable extent.

The glucose isomerase is formed intracellularly by culturing microorganisms in a culture medium containing xylose, xylan or such xylan-containing material as wheat bran.

For example, a glucose isomerase is formed substantially intracellularly when Streptomyces albus YT-No. 5 (ATCC No. 21132) is inoculated to a culture medium (pH 7) containing 3 percent of wheat bran, 4 percent of corn steep liquor and 0.024 percent of $CoCl_2 \cdot 6 H_2O$ and culturing the microorganism under aeration at 30°C for 25 to 30 hours.

The glucose isomerase formed within the cells in this manner may be used as an enzyme for the isomerization reaction either as it is contained within the cells or as an extract taken therefrom.

An assay of the activity of the glucose isomerase was carried out in the following reaction mixture.

| | |
|---|---|
| 0.2 M phosphate buffer solution (pH 7.5) | 0.5 ml |
| 1 M glucose solution | 0.2 ml |
| 0.1 M MgSO₄ solution | 0.1 ml |
| Enzyme solution | 0.2–0.3 ml |

The foregoing was make up to 2 ml total volume with water and incubated at 70°C for 1 hour. The reaction was stopped by adding 2 ml of 0.5 M perchloric acid. The fructose was determined by the cysteine-carbazole method. The amount of enzyme necessary to produce 1 mg fructose from glucose per hour at 70°C under the above assay conditions, was defined as a unit of the enzyme.

The following Examples are further illustrative of this invention, and it will be understood that the invention is not limited thereto.

EXAMPLE 1

Each of several lots was prepared by adding to 36 g of glucose, 123 mg of $MgSO_4 \cdot 7H_2O$, 24 mg of $CoCl_2 \cdot 6H_2O$, 180 units of glucose isomerase and a different amount of $CaCO_3$ in the range of 0.25 to 1.5 g as a pH regulator. Each lot was made up to a total volume of 100 ml with water and incubated at 70°C for 46 hours. The fructose content and pH value were determined. The results are shown in Table 1. For comparison, the results obtained with a lot using phosphate buffer solution (0.05 M) are also given in the table.

TABLE 1

| Calcium carbonate (%) | pH value prior to start of reaction | pH value after reaction | Fructose formed (g/100 ml) | Isomerization ratio (%) |
|---|---|---|---|---|
| 0 | 7.5 | 4.9 | 4.79 | 13.3 |
| 0.25 | 7.0 | 6.0 | 7.81 | 21.7 |
| 0.50 | 6.9 | 6.1 | 7.16 | 19.9 |
| 0.75 | 7.0 | 6.2 | 8.21 | 22.8 |
| 1.00 | 7.0 | 6.2 | 8.57 | 23.8 |
| 1.50 | 7.1 | 6.2 | 8.53 | 23.7 |
| 0.05 M phosphate buffer solution | 7.0 | 6.4 | 11.5 | 32.0 |

Isomerization ratio is obtained by the following equation.
Isomerization ration = (Fructose/Total Sugar) × 100

From the table, it is clear that in the lot incorporating no pH regulator, the pH value of which was slightly higher prior to the start of reaction fell to 4.9 at the time the reaction was terminated when the reaction itself failed to continue efficiently. In the lot using the phosphate buffer solution and the lots incorporating calcium carbonate as a pH regulator, the pH value was maintained above 6 and the reaction was carried out efficiently.

EXAMPLE 2

Each of several lots was prepared by adding to 40 g of glucose, 123 mg of $MgSO_4 \cdot 7H_2O$, 24 mg of $CoCl_2 \cdot 6H_2O$, cells containing glucose isomerase (280 units) and a different amount of $MgCO_3$ as a pH regulator in the range of 0.25 to 1.5 g. Each lot was made up to a total volume of 100 ml with water and incubated at 70°C. The fructose content and pH value of the fractionated solution were determined. The results are shown in Table 2.

TABLE 2

| Magnesium carbonate (%) | pH value prior to start of reaction | pH value after reaction | Fructose formed (g/100 ml) | Isomerization ratio (%) |
|---|---|---|---|---|
| 0 | 7.5 | 5.7 | 11.9 | 29.8 |
| 0.25 | 8.0 | 6.68 | 14.4 | 36.1 |
| 0.50 | 8.15 | 6.80 | 15.4 | 38.5 |
| 1.00 | 8.20 | 6.90 | 16.0 | 40.0 |
| 1.50 | 8.30 | 7.08 | 15.4 | 38.5 |

It is clear from the table that in the lots incorporating magnesium carbonate as the pH regulator, the pH value was maintained in the neighborhood of 7 and the reaction was carried out efficiently compared with the lot incorporating no such pH regulator.

EXAMPLE 3

A mixture consisting of 30.1 g of cells in which glucose isomerase was fixed by heat-treatment of cells containing glucose isomerase (wet cells 4,000 units), 10 g of calcium carbonate and 20 g of pearlite intended to facilitate passage of liquid was packed in a double walled cylindrical column (inner wall measuring 2.5 cm in diameter and 37 cm in height), with hot water at 70°C circulated inside the outer wall to maintain the column temperature constant. An enzyme-converted syrup of starch (glucose content 44 percent, $MgSO_4$ content 0.005 M and $CoCl_2$ content 0.001 M) was fed downstream to this column at a flow rate of about 5 ml/hour and glucose was isomerized continuously to fructose. The operation was continued for 8 days. The fructose content and pH value of the fractionated solution was determined. A part of the results is shown in

TABLE 3

| Fraction number | Amount of fraction (ml.) | Flow rate (ml./hour) | pH value | Isomerization ratio (percent) | Total ion concentration[1] | Color (E420–E750) |
|---|---|---|---|---|---|---|
| Raw solution | | | 8.0 | 0.1 | 2,972 | 0.332 |
| 1 | 44 | 5.5 | 6.1 | 45.0 | 3,450 | 0.373 |
| 2 | 216 | 5.4 | 6.2 | 49.0 | 3,235 | 0.580 |
| 3 | 41 | 5.1 | 6.2 | 36.6 | 3,100 | 0.538 |
| 4 | 78 | 4.6 | 6.2 | 37.8 | | 0.507 |
| 5 | 33 | 4.6 | 6.0 | 35.5 | 3,165 | 0.498 |
| 6 | 68 | 4.0 | 5.9 | 37.7 | 3,023 | 0.517 |
| 7 | 36 | 5.1 | 6.0 | 34.3 | | 0.507 |
| 8 | 78 | 5.0 | 6.0 | 33.4 | 2,683 | 0.483 |

[1] P.p.m./l. of solution.

It is clear from the table that the pH value of the reaction solution was maintained above 6.2 and the reaction was carried out at an isomerization ratio above 33 percent.

The total ion concentration of the sugar solution after the reaction was in the range of 2,633–3,450 ppm in terms of 50 percent glucose solution. The values are virtually comparable with the total ion concentration 3,164 ppm in the raw solution prior to the reaction, indicating that there was substantially no increase in ion concentration ascribable to isomerization. In addition, the color (expressed in terms of difference of absorption coefficients at 420 mμ and 750 mμ) of the resultant sugar solution was less than twice that of the raw solution.

EXAMPLE 4

To the column prepared in the same way as in Example 3, an enzyme-converted syrup of starch (glucose content 44 percent without incorporating $MgSO_4$ and $CoCl_2$) was fed downstream at a flow rate of about 5 ml/hour. And glucose was continuously isomerized to fructose. The results are shown in Table 4.

TABLE 4

| Fraction number | Amount of fraction (ml.) | Flow rate (ml./hour) | pH value | Isomerization ratio (percent) | Total ion concentration [1] | Color (E420–E750) |
|---|---|---|---|---|---|---|
| Raw solution | | | 8.0 | 0.4 | 2,644 | 0.319 |
| 1 | 42 | 5.3 | 6.6 | 39.3 | 2,697 | 0.423 |
| 2 | 209 | 5.2 | 6.1 | 45.7 | 2,725 | 0.591 |
| 3 | 42 | 5.2 | 6.3 | 35.0 | 2,626 | 0.558 |
| 4 | 77 | 4.5 | 6.3 | 34.0 | | 0.511 |
| 5 | 31 | 4.4 | 6.1 | 34.3 | 2,577 | 0.516 |
| 6 | 51 | 3.0 | 6.1 | 32.6 | 2,559 | 0.552 |
| 7 | 21 | 2.9 | 6.4 | 32.2 | | 0.563 |
| 8 | 80 | 5.1 | 6.2 | 32.5 | 2,300 | 0.583 |

[1] P.p.m./l. of solution.

It is clear from the table that the pH value of the reaction solution was maintained above 6 and the reaction was carried out an isomerization ratio exceeding 30 percent.

As in the case of Example 3, the total ion concentration of the sugar solution after the reaction (2,300–2,725 ppm) was virtually the same as the total ion concentration 2,644 ppm of the raw solution, indicating that there was substantially no increase in the ion concentration ascribable to the isomerization reaction. Further, the color was less than twice that of the raw solution.

EXAMPLE 5

A mixture consisting of 20 g of cells in which glucose isomerase was fixed (wet cells 2,700 units), 5 g of magnesium carbonate and 20 g of pearlite was packed in a double walled cylindrical column (the inner wall measuring 2.5 cm in diameter and 37 cm in height), with hot water at 70°C circulated inside the outer wall to maintain the column temperature constant. To this column, a glucose solution (glucose concentration 30 percent, $CoCl_2$ content 0.001 M) was fed downstream at a flow rate of about 3 ml/hour. And glucose was continuously isomerized to fructose.

The results are shown in Table 5.

TABLE 5

| Fraction No. | Amount of fraction (ml) | Flow rate (ml/hour) | pH value | Isomerization ratio (%) |
|---|---|---|---|---|
| 1 | 32 | 3.6 | 6.6 | 42.0 |
| 2 | 25 | 1.6 | 6.9 | 42.2 |
| 3 | 39 | 2.6 | 7.3 | 54.0 |
| 4 | 36 | 4.0 | 7.2 | 51.0 |
| 5 | 24 | 3.0 | 6.9 | 51.7 |
| 6 | 39 | 3.1 | 7.1 | 51.0 |
| 7 | 46 | 3.1 | 6.4 | 47.9 |
| 8 | 19 | 2.1 | 6.0 | 48.8 |

It is clear from the table that the pH value of the reaction solution was maintained above 6 and the reaction was carried out at an isomerization ratio exceeding 40 percent.

EXAMPLE 6

Each of several lots was prepared by adding to 42 g of glucose, 123 mg of $MgSO_4 \cdot 7H_2O$, 24 mg of $CoCl_2 \cdot 6H_2O$, 1,200 units of glucose isomerase (extracted enzyme) and 10 g of a different ion-exchange resin as enumerated in Table 6. Each lot was made up to a total volume of 100 ml with water and incubated at 60°C. The fructose content and pH value of the fractionated solution were determined.

The results are shown in Table 6.

It is clear from the table that, in the absence of ion-exchange resin, the pH value fell below 6 and the reaction failed to continue efficiently. In the reaction carried out in the presence of an ion-exchange resin, particularly, an amphoteric ion-exchange resin, the pH value was maintained above 6 throughout the entire course of reaction and the isomerization reaction was carried out efficiently.

TABLE 6

| Ion-exchange resin used | Form of resin | Presence or absence of enzyme (+, −) | pH value prior to reaction | pH value after reaction | Isomerization ratio (percent) |
|---|---|---|---|---|---|
| No ion-exchange resin | | − | 8.1 | 4.6 | 2 |
| | | + | 7.5 | 5.8 | 26.4 |
| Retardation 11A-8 | H, OH | − | 8.6 | 7.4 | 20 |
| | | + | 8.3 | 6.9 | 42.2 |
| Amberlite IRA-400 | OH | − | 9.4 | 6.2 | 14.6 |
| | | + | 9.6 | 6.1 | 41.6 |
| Dowex 1-X8 | OH | − | 9.6 | 5.9 | 18 |
| | | + | 9.8 | 6.0 | 43.0 |
| Amberlite IRA-400 | OH | − | 8.4 | 5.8 | 22.2 |
| Amberlite IR-120 | Na | + | 8.3 | 6.3 | 50.4 |

EXAMPLE 7

A double walled cylindrical column (the inner wall measuring 2.5 cm in diameter and 37 cm in height) was packed with 30.1 g of cells in which glucose isomerase was fixed (wet cells, 4,000 units) and Retardion 11A-8 (an amphoteric ion-exchange resin of styrol type, H&OH form, 50–100 mesh), with hot water at 70°C circulated inside the outer wall to maintain the column temperature constant. To this column, a sugar solution consisting of 44 percent of glucose, 0.005 M of $MgSO_4$ and 0.001 M of $CoCl_2$ was fed downstream at a flow rate of 2–9 ml/hour. And glucose was continously isomerized to fructose. The operation was continued for 12 days. A part of the results is shown in Table 7.

TABLE 7

| Fraction number | Amount of fraction (ml.) | Flow rate (ml./hour) | pH value | Isomerization ratio (percent) | Total ion concentration [1] | Color (E420–E750) |
|---|---|---|---|---|---|---|
| Raw solution | | | 8.7 | 0 | 1,150 | 0.29 |
| 1 | 53 | 8.8 | 8.7 | 28.6 | | |
| 2 | 52 | 3.5 | 8.6 | 38.2 | | |
| 3 | 27 | 3.1 | 8.4 | 43.0 | | |
| 4 | 90 | 5.9 | 8.4 | 30.9 | | |
| 5 | 23 | 2.9 | 8.0 | 34.8 | 935 | 0.21 |
| 6 | 70 | 4.4 | 8.2 | 31.7 | | |
| 7 | 22 | 2.3 | 7.7 | 29.9 | | |
| 8 | 37 | 2.4 | 8.0 | 33.2 | | |
| 9 | 16 | 1.8 | 7.8 | 37.6 | | |
| 10 | 49 | 3.6 | 7.4 | 34.4 | | |

[1] P.p.m./l. of sugar solution.

It is clear from the table that the pH value of the reaction solution was maintained above 7 and the reaction was carried out at an isomerization ratio exceeding 30 percent.

The total ion concentration of the sugar solution after the reaction was 935 ppm per liter of the solution in terms of 50 percent glucose solution. This value is noted to be smaller than the total ion concentration 1,150 ppm of the sugar solution prior to the start of the reaction. After the termination of reaction, the color of the resultant solution was 0.21, a value which is not greater than the color 0.29 of the sugar solution prior to the start of reaction.

What is claimed is:

1. In the method of enzymatically converting glucose into fructose in a glucose-containing reaction solution containing glucose isomerase, the improvement comprising admixing with said reaction solution at least one reagent selected from the group consisting of magnesium carbonate, calcium carbonate, an anion-exchange resin and an amphoteric-ion exchange resin, and converting glucose to fructose in admixture with said reagent during the entire course of said conversion without regulating the pH of the reaction solution by addition of alkali whereby said reagent regulates the pH and suppresses the non-enzymatic conversion of sugar to acid.

2. A method as set forth in claim 1 wherein said reaction solution has a pH of between about 6 and 9.

3. A method as set forth in claim 1 wherein said glucose-containing isomerase and said reagent are packed in a column and a glucose-containing solution is passed through said column to form said reaction solution and said glucose is converted into fructose in said column.

4. A method as set forth in claim 3 wherein said reaction solution has a pH of between about 6 and 9.

5. A method as set forth in claim 4 wherein said reagent is magnesium carbonate.

6. A method as set forth in claim 4 wherein said reagent is calcium carbonate.

7. A method as set forth in claim 4 wherein said reagent is an anion-exchange resin.

8. A method as set forth in claim 4 wherein said reagent is an amphoteric-ion exchange resin.

* * * * *